United States Patent [19]
Castens

[11] Patent Number: 5,067,601
[45] Date of Patent: Nov. 26, 1991

[54] CLUTCHES

[76] Inventor: Rudolf R. Castens, Romostar Corporation N.V. Centro Comercial Antilia No. 18, P.O. Box 3429, Curacao, Spain

[21] Appl. No.: 418,795

[22] Filed: Oct. 3, 1989

Related U.S. Application Data

[63] Continuation of Ser. No. 112,638, Oct. 22, 1987, abandoned, which is a continuation-in-part of Ser. No. 16,458, Feb. 18, 1987, abandoned, which is a continuation-in-part of Ser. No. 821,453, Jan. 22, 1986, abandoned.

[51] Int. Cl.$^5$ .............................................. F16D 11/00
[52] U.S. Cl. ..................................................... 192/65
[58] Field of Search ..................... 192/45, 65, 3.3, 3.32

[56] References Cited

U.S. PATENT DOCUMENTS

| | | |
|---|---|---|
| 575,988 | 1/1897 | Rauhoff . |
| 1,434,970 | 11/1922 | Taylor . |
| 1,585,140 | 5/1926 | Erban . |
| 1,670,197 | 5/1928 | Humfrey . |
| 1,834,843 | 12/1931 | Humfrey . |
| 1,901,714 | 3/1933 | Vincent . |
| 1,929,782 | 10/1933 | Hughes . |
| 2,397,414 | 3/1946 | Fast . |
| 2,401,864 | 6/1946 | Gerst . |
| 2,407,060 | 9/1946 | Croft . |
| 2,601,012 | 6/1952 | Wolff . |
| 3,078,974 | 2/1963 | Mann . |
| 3,403,762 | 10/1968 | Auriol . |
| 3,557,921 | 1/1971 | Takada .. |
| 3,800,927 | 4/1974 | Takata ................................ 192/45 |
| 3,866,726 | 2/1975 | Arenz . |
| 4,770,279 | 9/1988 | Shiozaki et al. ...................... 192/45 |

FOREIGN PATENT DOCUMENTS

| | | |
|---|---|---|
| 230739 | 10/1960 | Australia . |
| 1915516 | 3/1968 | Fed. Rep. of Germany . |
| 428338 | 2/1986 | Switzerland . |
| 3773 | of 1898 | United Kingdom . |

Primary Examiner—John E. Murtagh
Assistant Examiner—Creighton Smith
Attorney, Agent, or Firm—Malin, Haley, McHale, DiMaggio & Croby

[57] ABSTRACT

A positive axial clutch including a first inner having a surface of revolution about the axis of rotation of the clutch, which surface is substantially a hyperboloid through every point on which two straight line generators may be drawn so as to lie wholly in the surface. A second outer race defined with the first inner race, an annular space between confronting surfaces of the races, one of which is the surface of revolution. A plurality of thrust transmitting rollers are disposed in the annular space between the races so as to engage with the surfaces thereof to make thrust transmitting contact between confronting surfaces for driven rotation of the first or second races in at least one direction, with each roller contacting the surface of revolution of the first inner race along a generator of the surface or a line which approximates to such a generator. The rollers are all similarly inclined with respect to radial planes. Means is provided at the interface between at least one end portion of each of the rollers and at least one of the races to permit slidable movement therebetween at least in a first direction while supporting the rollers axially thereof.

14 Claims, 9 Drawing Sheets

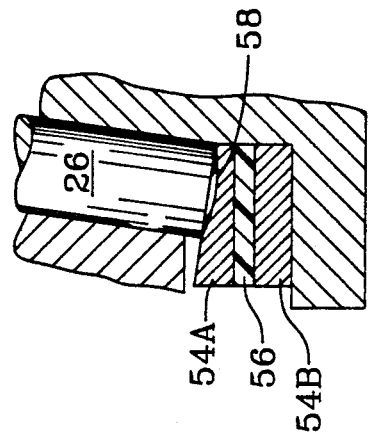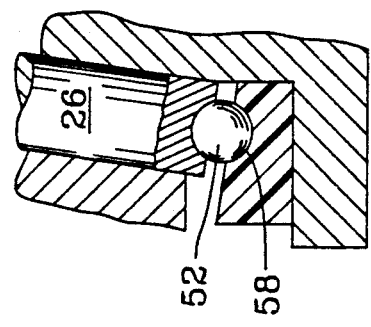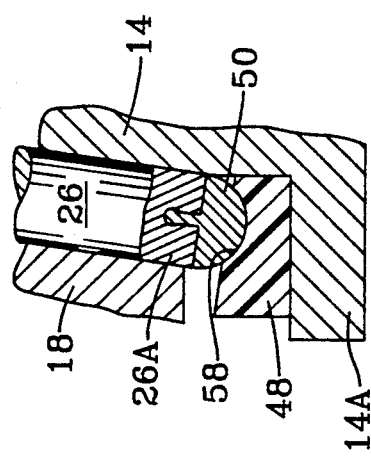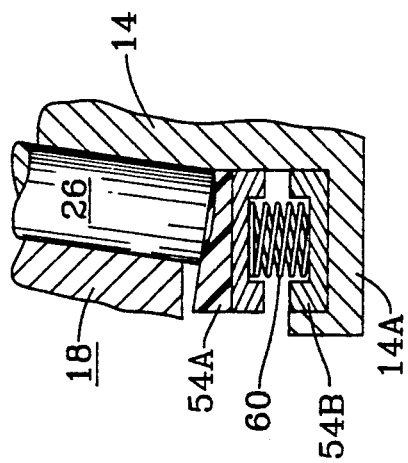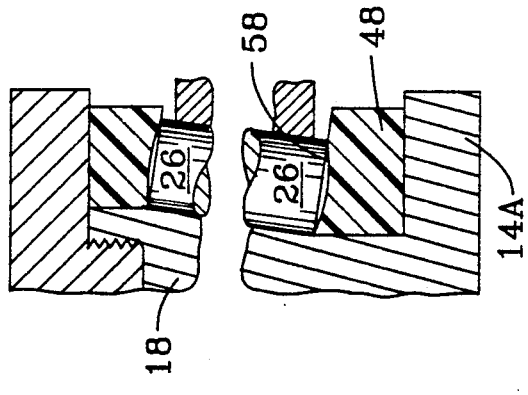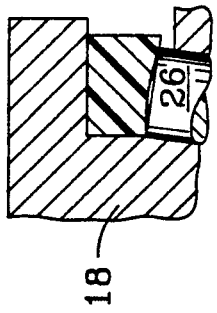

CLUTCHES

This is a continuation of pending prior application Ser. No. 07/112,638 filed on Oct. 22, 1987 now abandoned, which is a continuation-in-part of application Ser. No. 016,458, filed Feb. 18, 1987, now abandoned which is a continuation-in-part of application Ser. No. 821,453, filed Jan. 22, 1986, now abandoned.

BACKGROUND OF THE INVENTION

1. Field of the Invention

The present invention relates to a one-way clutch and in particular, it relates to an improved positive axial clutch of the type which transmits torque in one direction and free-wheels in the opposite direction.

2. Description of the Related Art

One way clutches of various types are presently known. Of such clutches, possibly the type most known, is the sprag clutch which includes inner and outer races having a number of so called sprags held in position by a cage. The sprags are configured such that rotation of one race in a first direction causes camming engagement of the sprags with the respective surfaces, whereas rotation in the opposite direction causes free-wheeling of the clutch due to the fact that the sprags do not cam the surfaces in that direction.

U.S. Pat. No. 3,557,921 to Takada relates to a one-way clutch in which an inner and outer race has rollers interposed therebetween to effect one-way torque transmission while free-wheeling in the opposite direction. This clutch, however, presents a disadvantage in that the motion of the rollers is such as to cause their end portions to engage one of the clutch races when the clutch is placed in either the clutch engagement or free-wheeling mode thereby inhibiting the clutch motion and ultimately causing distortion of the race as well as the actual rollers. This distortion ultimately affects the clutch operation adversely in both directions. U.S. Pat. Nos. 1,670,157 and 1,834,843, both to Humphrey, disclose similar clutches which suffer from similar drawbacks.

U.S. Pat. No. 3,866,726 to Arenz relates to a releasable coupling which may be a clutch or a brake and which has a hollow member whose cavity is bound by an inner cylindrical wall. A stack of discs are inclined relative to the axis of the hub shell and the axis of rotation. Abutment means is provided for engaging the discs in an axial direction to provide movement of the discs toward and away from a locking engagement position with the inner wall of the hub steel. Other patents disclose related torque transmission devices which include U.S. Pat. No. 2,407,060 to Croft, U.S. Pat. No. 2,601,012 to Wolff, U.S. Pat. No. 2,401,864 to Gerst, U.S. Pat. No. 2,397,414 to Fast, U.S. Pat. No. 1,585,140 to Erban, U.S. Pat. No. 1,434,970 to Taylor, U.S. Pat. No. 575,988 to Rauhoff, U.S. Pat. No. 3,773 to Breslauer None of these patents disclose clutches wherein the inner and outer clutch races have hyperboloidal surfaces between which rollers are positioned to provide one-way clutch transmission, and opposite directional free-wheeling while supporting the rollers axially and permitting uninhibited rotational movement whenever required during clutch operation, particularly the free-wheeling mode. I have invented a clutch which avoids such disadvantages.

SUMMARY OF THE INVENTION

The object of the present invention is to provide an improved clutch of the hyperboloidal type which may be engaged and disengaged and which may be adapted to drive in one direction when engaged and to free-wheel or overrun in the opposite direction when disengaged, or which may be engaged and disengaged and adapted to drive in both directions when engaged.

Thus, a positive, axial clutch in accordance with the present invention includes a first member having a surface of revolution about the axis of rotation of the clutch, which surface is, or approximates to, a hyperboloid through every point on which two straight line generators may be drawn so as to lie wholly in the surface, a second member defining with the first member an annular space between confronting surfaces of the members, one of which is the surface of revolution, and a plurality of thrust transmitting rollers, disposed in the annular space so as to make thrust transmitting contact between the confronting surfaces in the engaged condition of the clutch for driven rotation of the first or second member in at least one direction. Each roller then contacts the surface of revolution of the first member along a generator of the surface or a line which approximates to such a generator. The rollers are all similarly inclined with respect to radial planes, i.e. planes containing the central axis. The invention further comprises means at the interface between at least one end portion of each of said rollers and at least one of the first and second members to permit slidable movement therebetween at least in a first direction while supporting the rollers axially thereof. By slidable movement, it is contemplated that the movement between the rollers and the member is relatively uninhibited and free, unencumbered by friction forces, gouging action, or the like.

By a "positive" clutch is meant a clutch which will transmit torque without slip.

By an "axial" clutch is meant a clutch which is engaged and disengaged axially, and which is engaged axially with axial contact pressure.

A clutch in accordance with the present invention is adapted as a unidirectional clutch by forming the confronting surface of the second member as a surface of revolution which approximates to a hyperboloid as aforesaid, about the axis of rotation of the clutch, the rollers making thrust transmitting contact between confronting surfaces of the members which converge solely in one direction with respect to the axis of rotation of the clutch, in the engaged condition of the clutch. Moreover, the clutch according to my invention may be assembled so as to provide engagement in one direction, while upon disassembly, the rollers may be oppositely inclined to provide engagement in the opposite direction.

A clutch in accordance with the present invention is adapted to drive in both directions, when engaged, by locating the rollers in grooves formed in the second member, each groove having a maximum or minimum radius in radial planes at a point lying on a line which approximates to a generator of an imaginary hyperboloid as aforesaid, about the axis of rotation of the clutch, the grooves being so shaped in such planes as to provide ramp surfaces for the rollers extending on each side of each of the lines, the rollers again making thrust transmitting contact between confronting surfaces of the members which converge solely in one direction with respect to the axis of rotation of the clutch, in the engaged condition of the clutch.

According to my present invention, the surfaces are generally conical hyperboloidal surfaces having a diameter at one end portion of each member greater than the diameter at the other end portion of the same member. Further, the clutch according to the present invention includes first and second members which are axially fixed, whereby relative rotation of the members in one direction causes thrust transmitting engagement of the rollers between the confronting surfaces by increasing the force exerted by the end portion of the rollers against a means at the interface between at least one end portion of each of said rollers and at least one of the first or second members closest to said one end portion of said members. Likewise, relative rotation in the other direction breaks the thrust transmitting engagement by reducing the force exerted by the rollers against said means at the interface.

According to one embodiment each roller is located in a groove in one of the confronting surfaces. The first and second members are relatively movable axially from a first position, in which the rollers contact only the surfaces of their respective grooves and no rotation is transmitted between the members, to a second position in which the rollers engage the other confronting surface and are cammed by ramp surfaces provided by the grooves into thrust transmitting engagement with the confronting surfaces. Further, my invention includes an embodiment wherein one member is biased to the first position and means are provided to move the one member into the second position against the bias. Cam means may be provided to move the one of the members into the second position The rollers may be elliptical in cross-section. Further, the inner member may be axially movable to provide free-wheeling in what is normally the drive direction.

According to another embodiment, the means at the interface between the rollers and at least one of the first and second members is an annular support member positioned on, and supported by at least one of the members beneath the rollers at the portion of contact with the hyperboloidal surface corresponding to the larger diameter end of each member. The annular support member is preferably fabricated of a self-lubricating resilient, compressible material and is thereby capable of slidable rotation relative to at least one of the members so as to freely support the rollers rotatably relative to at least one of the members. The annular member is preferably a ring member fabricated of NYLATRON brand material and having one surface in engagement with the end portions of the rollers so as to support the rollers rotatably relative to at least one of the members. NYLATRON is generally a combination of nylon and molybdenum disulphide to provide lubricity. However, in some instances, simply nylon has proven to have sufficient resilience, compressibility and lubricity.

In one embodiment, the supported end portions of the rollers are arcuately shaped and the annular ring member is configured to have a plurality of correspondingly shaped arcuate cavities on the roller supporting surface so as to receive the end portions of the rollers in nestled relation and thereby maintain the rollers in predetermined spaced relation corresponding to the dimension between the cavities. The generally conical hyperboloidal surfaces are capable of thrust transmitting contact so as to transmit torque between the members in dependence upon the number and diameter of the rollers, the length of the rollers, the angle of inclination between the rollers and the generating lines of the surfaces.

The torque transmitted between the members is generally dependent upon the radius of the inner conical hyperboloidal surface at the smaller end and the radius thereof at the larger end.

According to another embodiment, the means at the interface between the rollers and at least one of the first and second members is comprised of a pair of face-to-face annular members supported in spaced relation by a plurality of rotatable bearing members. The rotatable bearing members may be spherical bearing balls, roller bearing members, or tapered roller bearing members.

According to another embodiment, a roller cage is provided having an elongated roller supporting member positioned between each pair of adjacent rollers and in contact therewith to maintain a predetermined circumferential roller-to-roller spacing. Each elongated member of the roller cage is connected at one end to the means at the interface between the rollers and at least one of the first and second members such that the elongated members rotate at the same rate as the interface means.

According to still another embodiment, the means at the interface between the rollers and at least one of the first and second members comprises a pair of annular support members having resilient support means positioned therebetween such that upon engagement of the first and second members and the rollers, the resilient means becomes resiliently compressed to thereby reduce the rate of change of engagement forces between the first and second member upon clutch engagement. The resilient support means may be a plurality of circumferentially spaced resilient springs or an annular shaped member fabricated of compressible resilient material. Further, the pair of annular support members may be of NYLATRON brand material which may differ in resilience from the intermediate resilient means to thereby selectively alter the resilience and/or compressibility which the rollers encounter.

The annular support member may define a plurality of radially extending cavities configured to support the end portions of the rollers and to thereby maintain a predetermined circumferential roller-to-roller spacing corresponding to the spacing of the cavities. In this instance, the end portion of each roller may be arcuately configured to nestle within the cavities.

According to yet another embodiment, the annular support member defines a continuous annular cavity having a cross-sectional configuration corresponding to the configuration of the end portions of the rollers to thereby support the rollers in nestled relation.

In still another embodiment, the annular roller cage is positioned between one of the first and second members and the rollers, the annular roller cage having a plurality of circumferentially spaced arcuately shaped cavities each shaped to support a surface portion of a respective roller and to thereby maintain a predetermined circumferential roller to roller spacing corresponding to the spacing of the roller supporting cavities.

The invention also includes alternate forms of construction of the first and second members, i.e., the races. At least the portion of at least one of the races defining a hyperboloidal surface is comprised of a plurality of annular members positioned in face-to-face engaged relation and progressively dimensioned to define a substantially hyperboloidal surface. For example, the inner race may be formed from a plurality of washer-like members secured together in face-to-face relation, the outer diameters of the "washers" being progressively waved to form a generally hyperboloidal surface. Similarly, a plurality of "washers" having progressively variable inner diameters to create a generally hyperboloidal surface when assembled may be provided.

Further, at least one of the inner and outer races may be comprised of a plurality of annular members positioned in spaced face-to-face relation and having compressible resilient means positioned between adjacent annular members. The annular members are progressively dimensioned such that they define the substantially hyperboloidal surface. The resilient means thereby reduces the rate of change of forces transferred between the inner and outer races and the rollers upon transfer of torque therebetween.

According to still another embodiment, at least one of the inner and outer races may define a substantially hyperboloidal surface having a cross-section of predetermined wavy configuration to provide predetermined break-away clutch disengagement when torque transferred between the inner and outer races and the rollers reaches a predetermined level.

BRIEF DESCRIPTION OF THE DRAWINGS

Specific embodiments of the present invention will now be described by way of example, and not by way of limitation, with reference to the accompanying drawings in which:

FIG. 12 is a partial cross-sectional view of an alternate embodiment of the clutch utilizing a second alternate roller and support ring arrangement;

FIG. 13 is a partial cross-sectional view of an alternate embodiment of the clutch utilizing a third alternate roller and support ring configuration;

FIG. 14 is a partial cross-sectional view of an alternate embodiment of the clutch utilizing a fourth alternate roller and support ring configuration;

FIG. 15 is a partial cross-sectional view of a second alternate embodiment of the clutch utilizing a fifth alternate roller and support ring configuration at the top and bottom of the roller;

FIG. 16 is a partial cross-sectional view of an alternate embodiment of the clutch utilizing a sixth alternate roller and support ring configuration at both ends of the rollers;

FIG. 17 is a partial cross-sectional view of a fourth alternate embodiment of the clutch utilizing a seventh alternate roller support ring configuration;

30 positioned between the clutch races and maintaining roller-to-roller spacing;.

Figure 36:
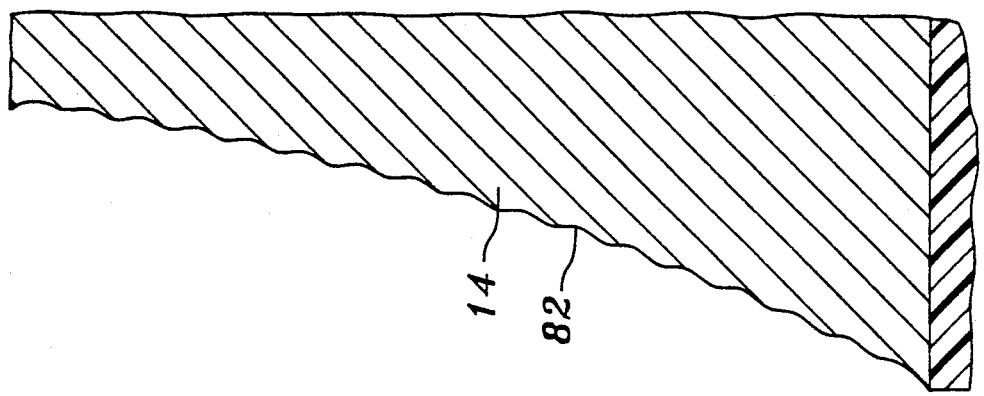
Figure 35:
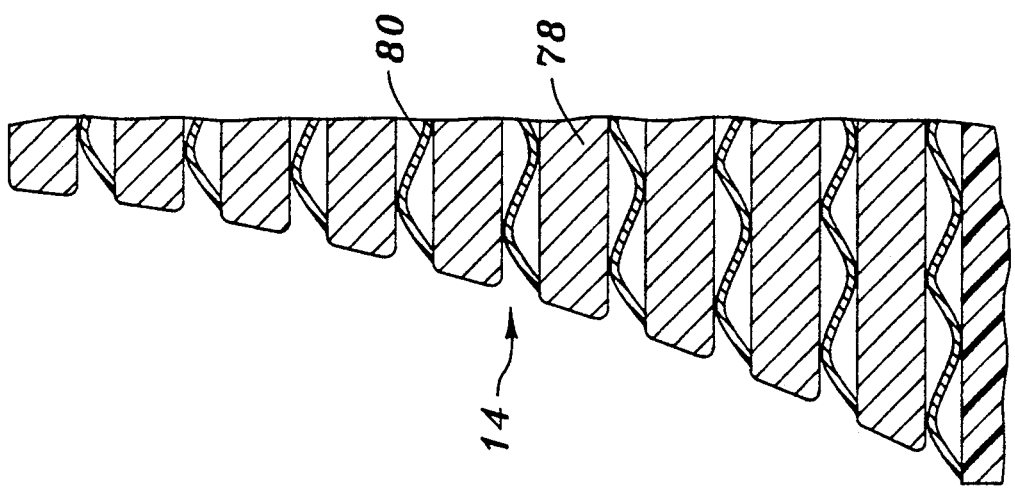
Figure 34:
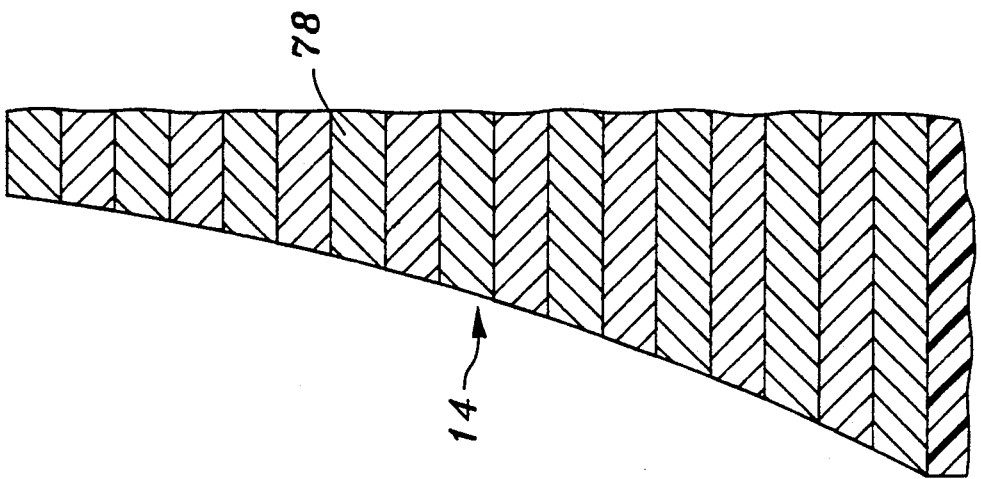

FIG. 34 is a cross-sectional view of an alternate embodiment of a hyperboloidal inner clutch race formed of a plurality of annular rings of predetermined progressively increasing dimensions;

FIG. 35 is a cross-sectional view of a second alternate embodiment of a hyperboloidal inner clutch race of the type illustrated in FIG. 34 but having a plurality of resilient springs positioned between the annular rings and dimensioned to provide a hyperboloidal surface; and FIG. 36 is a cross-sectional view of a hyperboloidal clutch race formed from a unitary workpiece, but having a modified wavy hyperboloidal surface which provides predetermined clutch overload breakaway disengagement.

DETAILED DESCRIPTION OF THE PREFERRED EMBODIMENTS

Figure 1:
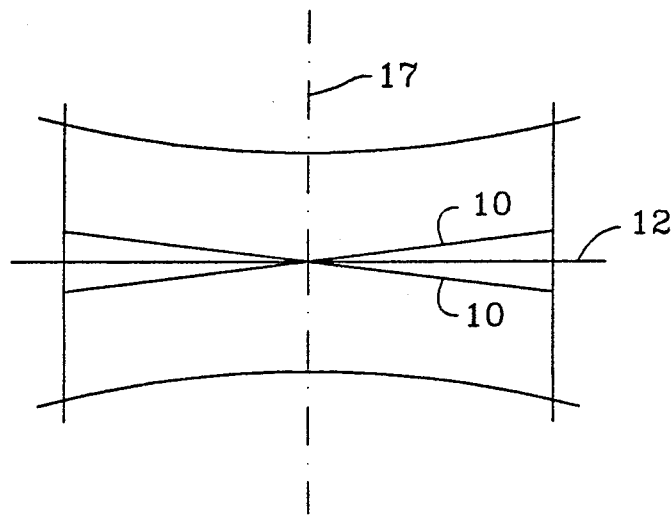
FIG. 1 is a schematic diagram illustrating a hyperboloidal surface with straight line generators.

With reference now to the accompanying drawings and first to FIG. 1, this FIG. illustrates a hyperboloid of one sheet defined as a ruled surface which is such that through every point of the surface, two straight lines such as illustrated at 10 and called generators can be drawn so as to lie entirely in the surface. The hyperboloid illustrated is a surface of revolution about the central axis 12, which is the axis of rotation of the positive, axial clutches which will be described hereinbelow.

Figure 2:
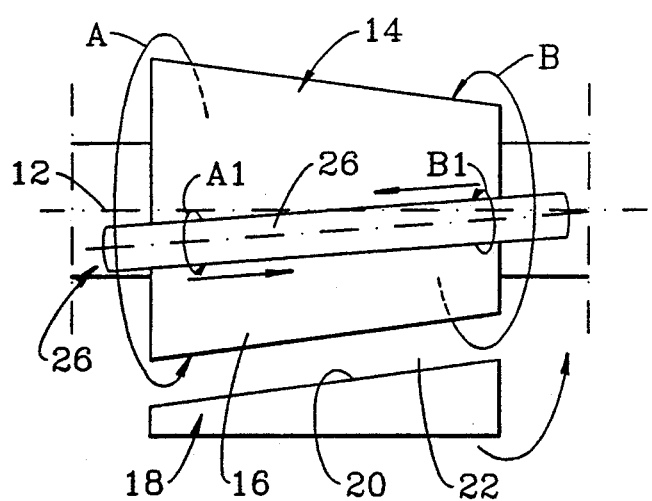
FIG. 2 is a diagrammatic cross-sectional representation illustrating the principles of a unidirectional clutch constructed in accordance with the present invention.
Figure 3:
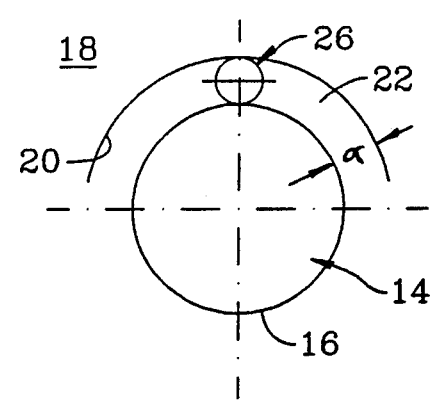
FIG. 3 is a view of the clutch of FIG. 2 looking toward the right hand end in FIG. 2.

Referring now to FIGS. 2 and 3, the present clutch comprises a first and inner member 14 (inner race) having an outer surface of revolution 16 about the axis 12 defined approximating that part of the hyperboloid shown in FIG. 1 immediately to the left hand side of the radial plane defined by the chain-dotted line 17 in that FIG. Such plane contains the minimum radius of the hyperboloid in radial planes perpendicular to the axis 12. The clutch further includes a second and outer annular member 18 (outer race), the inner surface 20 of which may, as shown in FIGS. 1 and 2, be formed as a surface of revolution about the axis 12 which approximates to a part of a hyperboloid as already defined with reference to FIG. 1. Such hyperboloid has a minimum radius in radial planes of $r+d$ where r is the radius of the surface 16 in the plane and d is one radial gap dimension of an annular space 22 formed between the confronting surfaces 16 and 20 of the inner and outer members. A plurality of thrust transmitting members 26 formed as cylindrical needle rollers of radius R1 are disposed in the space 22 so as to make contact with the surface 16 along a generator 10 of the surface 16. In the engaged condition of the clutch, the rollers 26, of which there are four or more in number, are all similarly inclined with respect to the radial planes.

The rollers 26 make contact with the surfaces 16 and 20 each along a line which winds helically with respect to the roller axis. These helically curving lines of contact of the rollers 26 with the surfaces 16 and 20 approximate to generators 10 of a hyperboloid and approach such generators as the radius R1 of the rollers is reduced.

Referring now to FIGS. 2 and 3, consider rotation of the outer member 18 relative to the inner member 14 in the direction of the arrow A. This causes the rollers to rotate in the same direction about their own respective axes and therefore to move in the same direction A1 as the arrow A relative to the inner member 14. However the two ends of each roller are at different radii and the ends at the greater radius will tend to move faster than the ends at lesser radii thus causing the rollers to jam in the gap between the surfaces and transmit torque between members 14 and 18. Equally, if the outer member rotates in the direction of the arrow B then the rollers will rotate in the direction B1 and tend to move in the opposite direction so as to and move out of jamming engagement and thereby permit freewheeling of one race member relative to the other 14 and 18. Thus it can be seen that for one direction of relative rotation the clutch transmits rotation while in the other there is simply a free-wheeling action, which direction is determined by whether the rollers are located with right hand or left hand skew.

Figure 5:
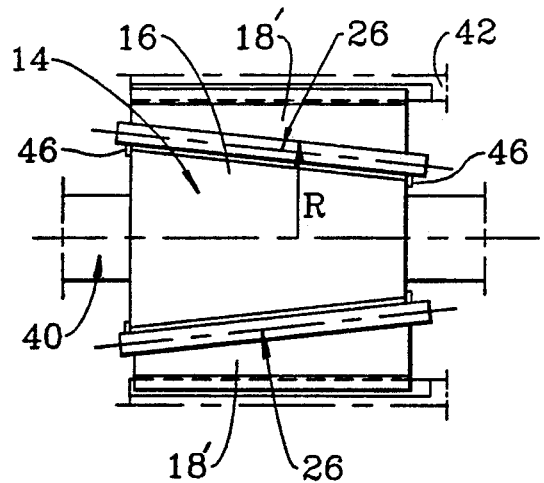
FIG. 5 is a cross-sectional representation of the clutch shown in FIG. 4 and illustrating the rollers.
Figure 6:
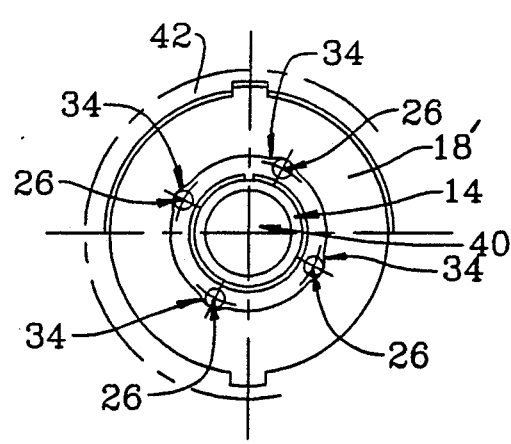
FIG. 6 is a view of the clutch of FIG. 5 looking on the right hand end in FIG. 5.
Figure 7:
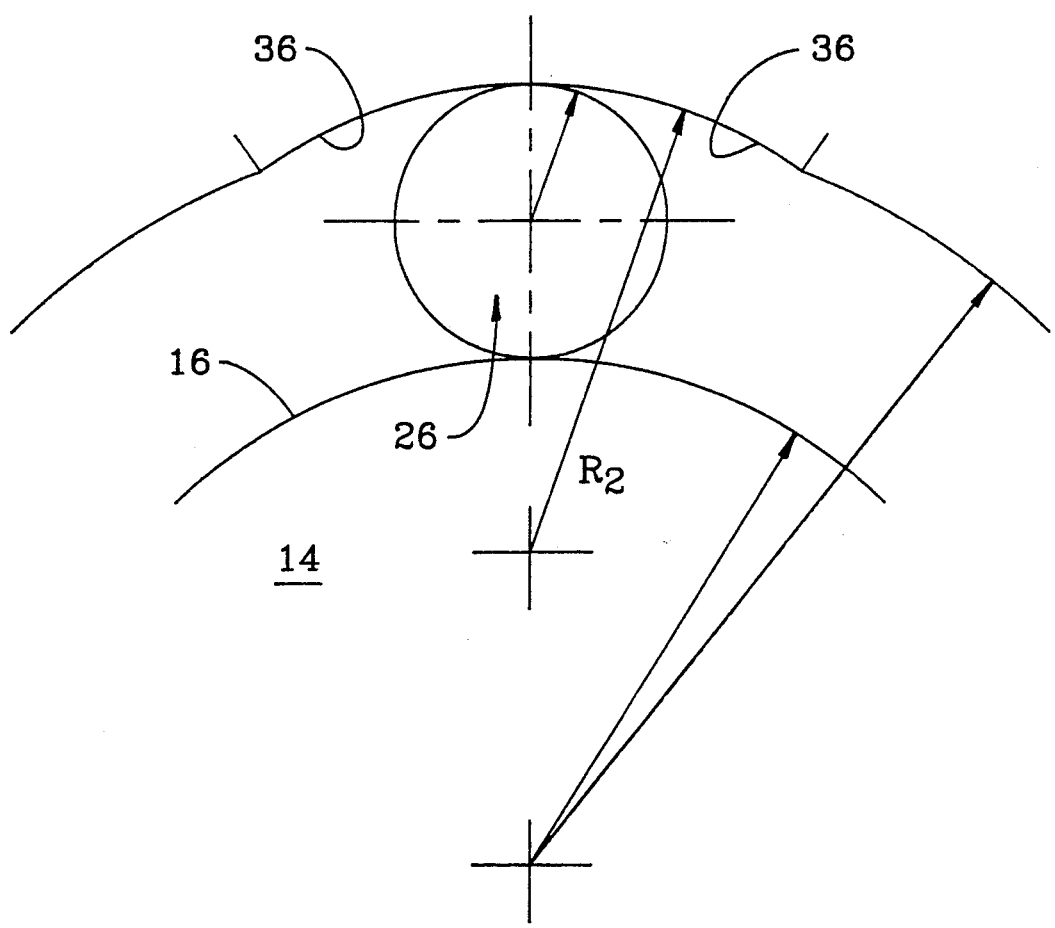
FIG. 7 is an enlarged view of a segment of the clutch of FIG. 6 illustrating one embodiment in which the rollers are operative within respective grooves having ramp surfaces on either side of the roller.

Referring now to FIGS. 5 to 7, in this case the rollers 26 are located in grooves 34 formed in the second and outer member 18', each groove having a maximum radius R (see FIG. 5) in radial planes at a point lying in a line which again approximates to a generator 10 of an imaginary hyperboloid of one sheet as already defined above, in the manner described above with reference to the helically curving lines of contact of the rollers with the surface 20, the grooves 34 being curved in such planes at a radius R2 (see FIG. 7) to provide ramp surfaces 36 for the rollers extending on each side of their lines of contact with the outer member 18' in oppositely inclined pairs.

Figure 4:
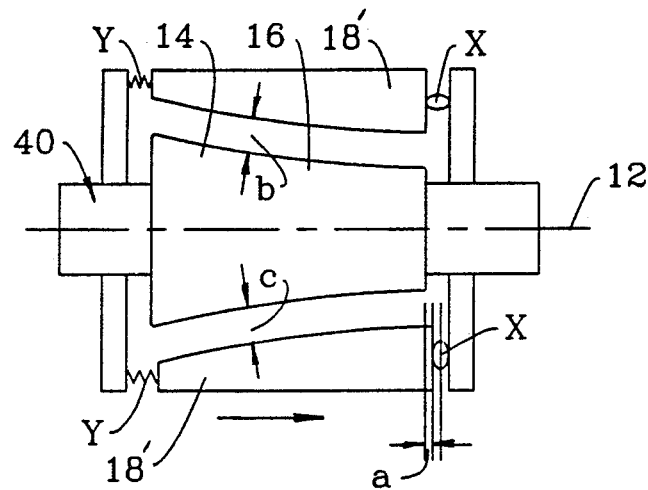
FIG. 4 is a diagrammatic cross-sectional elevation of a clutch constructed in accordance with the present invention adapted to drive in one direction when engaged and shown at the top and the bottom of the FIG. respectively in its engaged and disengaged conditions.

Referring now to FIG. 4, there is shown schematically, an arrangement of the clutch of the present invention whereby the clutch can be readily adjusted to freewheel in one or both directions by being structured to be selectively disengaged and engaged as may be desired. In FIG. 4 the clutch is engaged by displacing the outer member 18' by the operation of cam means X against the action of a spring or springs Y which act to disengage the clutch under the control of the cam means. In the engaged condition shown in the lower portion of FIG. 4, the rollers 26 make thrust transmitting contact between the outer surface of revolution 16 of the inner member 14 and corresponding ramp surfaces 36 of the ramp pairs, depending upon the direction of rotation, and drive may be transmitted in either direction by suitable linkage.

The clutch is self-energizing in the sense that upon engagement and subsequent rotation of the rollers 26 the inner and outer members 14, 18' are axially displaced relative to one another to engage the clutch with axial contact pressure, and it will be understood that such contact increases as the torque increases.

Referring once again to FIG. 4, the clearance $c = 0.02 - 0.1$ mm $> b$ is all that is generally necessary for disengagement or overrun of the clutches being described and the axial movement required to engage and disengage the clutches may, therefore, be made very small. Depending upon dimensional variations, however, such clearance values may change. Thus, the values set forth herein are exemplary.

Engagement as such is practically instantaneous, direct, and virtually soundless, and is positive, i.e. without any slip occurring.

Instead of cylindrical rollers 26, elliptically sectioned rollers might be used.

The inner member 14 is shown mounted on a shaft 40 extending on both sides of the member. The outer member 18' is axially splined to drive a further member 42 which may be toothed gear member for example.

Spring rings 46 may be provided loosely positioning the rollers 26 in the grooves 34.

The grooves 34 may be formed in the inner member 14 instead of the outer member 18' if desired, a suitable retaining means or cage 74 being provided to maintain the rollers 26 in the grooves during overrun of the clutch.

The hyperboloidal clutch described with reference to FIGS. 4 to 7 may be looked upon as a two-way freewheel with a two-way grip and disengagement device operable by the cam means.

The surface 16 of the inner member 14 may, in a modified construction of either clutch also approximate to that part of the hyperboloid shown in FIG. 1 immediately to the left hand side of the radial plane defined by the chain-dotted line 17. In this case the cylindrical axes of the rollers 26 each lie along a generator 10 of an imaginary hyperboloid of 1 sheet as hereinbefore defined, the rollers all being similarly inclined with respect to the radial planes of the clutch, and the rollers 26 making line contact with the inner member along a helically curving line.

Figure 8:
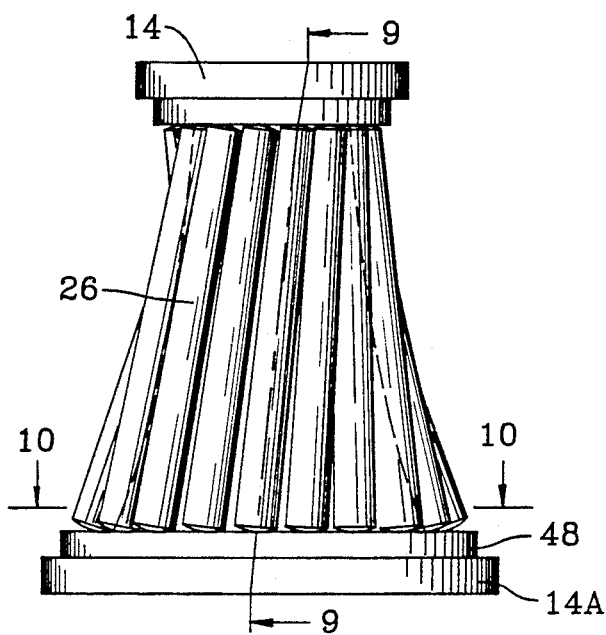
FIG. 8 is a side elevational view of the inner race and rollers of a clutch constructed according to the present invention, with a slidable roller support ring supported by the inner race.
Figure 9:
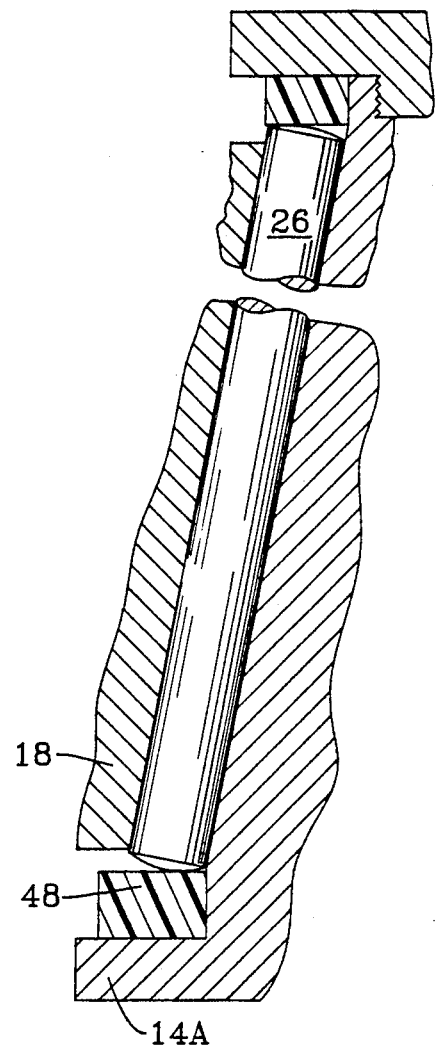
FIG. 9 is an enlarged cross-sectional view partially broken away of a clutch constructed according to the invention with the outer race removed and illustrating the rollers disposed on the inner race with the rollers resting on a slidable annular roller support ring and touching an upper annular ring.
Figure 10:
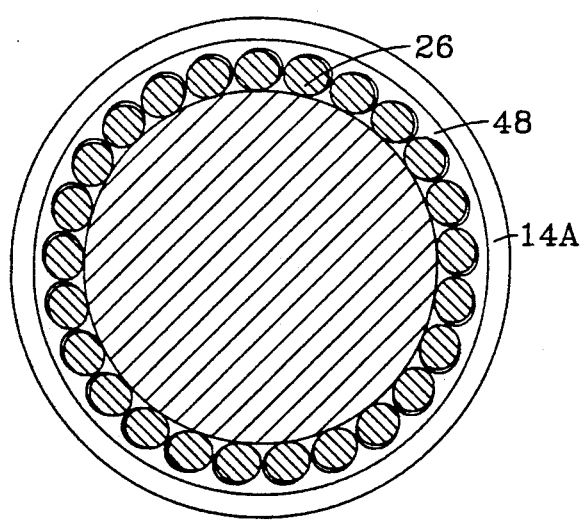
FIG. 10 is a cross-sectional view taken along lines 10—10 of FIG. 8.

Referring now to FIGS. 8-10, there is illustrated a preferred embodiment of the clutch of the present invention in which inner race 14 is surrounded by needle rollers 26 with outer race 18 removed for convenience of illustration. It has been discovered that the clutch operation is significantly enhanced and the running life of the clutch is correspondingly enhanced by the provision of a slidable support ring 48 positioned at the interface between the ends of the needle rollers 26 and the corresponding support component of the clutch, in this case the lower annular support ring 14A which forms part of inner race 14. The support ring 48 is preferably of a self-lubricating and compressible resilient material in comparison to support ring 14A so as to afford the needle rollers 26 the ability to rotate relatively freely during free-wheeling and clutch engagement, without interference or engagement with the supporting structure of the clutch.

Figure 11:
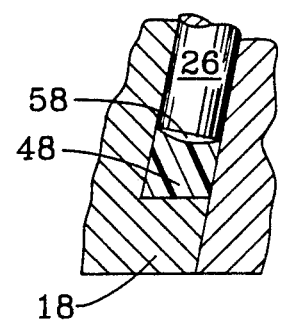
FIG. 11 is a cross-sectional view of an alternate embodiment of the invention in which the slidable annular roller support ring is supported by the outer race.

Further, by providing such a support ring in the form of a slidable and durable material (i.e. a relatively hard synthetic material such as NYLATRON marketed by Polymer Corporation, Reading, Pa.), a slidable and durable ring is provided which has been found to effectively prevent adverse interaction between the needle rollers and the clutch races. Thus, when the clutch rotates in the free-wheeling direction, the needle rollers 26 freely rotate with the NYLATRON ring 48 with no interference whatsoever due to the presence of support ring 48. Correspondingly, when the clutch rotates in the engagement mode, the rollers initially engage the NYLATRON ring causing some resilient compression with the top surface of ring 14A, only to return to their original position during torque transmission. In some instances, the needle rollers may actually slide over the top surface of the NYLATRON ring; NYLATRON is a self-lubricating material which readily permits such sliding action. To practice the invention, however, all that is needed in fact is any supporting slidable means at the interface between the needle rollers 26 and the inner race 14, or in some instances, as can be seen in FIG. 11, the outer race 18, to effect supporting and slidable action of the needle rollers relative to at least one of the clutch races.

In the preferred embodiment, a NYLATRON ring or equivalent interface means is provided at both ends of the hyperboloidal cone surfaces; i.e., the smaller diameter end as well as the larger diameter end as shown, for example in FIGS. 9, 15 and 16. Thus, the rollers will tend to "touch" the rings at all inoperative times. When the clutch is engaged the rollers will initially slightly compress the ring at the larger end and then return to the original position during operation. During freewheeling, the rollers will slide smoothly over the ring at the larger diameter end. Moreover, if the ring is of loose fit, the ring will rotate with the rollers; this is definitely the case where the ring is configured with nestling concavities (as described below) for the rollers. When the ring is press fitted to the race, the rollers will slide thereover in which case no concavities will be provided. In most instances, the rollers will touch the ring at the smaller diameter end and sometimes resiliently compress the contact area at least temporarily. Both rings being of resiliently compressible NYLATRON have proven to enhance clutch operation, providing smooth engagement and free-wheeling coupled with extended operation.

Referring now to FIG. 12, there is shown an embodiment of the invention whereby an alternate structure is provided to create a means at the interface between the needle rollers 26 and the inner race 14 to provide slidable movement of the rollers. In FIG. 12 the lower portion 26A of rollers 26 are fitted with end plugs 50 which are constructed of a hard, durable self-lubricating material such as NYLATRON. Such end plugs are preferably incorporated in combination with the NYLATRON ring 14A of FIGS. 8-11 and the ring is further provided with a plurality of circumferentially spaced cavities having a cross-section corresponding to the cross-sectional configuration of the end portions of the rollers. With such arrangement, the rollers are supported and nestled in the cavities thus readily facilitating slidability of the rollers relative to the clutch inner race (in FIG. 12) while permitting ready rotation of the rollers about their own axes. Thus, free-wheeling of such clutch is readily permitted without undue excessive engagement and/or distortion of the rollers with otherwise utilized roller supporting clutch parts. Similarly, clutch engagement is free of undue resistance to roller movement prior to becoming jammed between the races.

Referring to FIG. 13 there is shown another embodiment of the roller supporting interface means whereby each roller is provided with a bearing ball 52 secured at the lower end either by nestling the same in a cavity in the roller as shown or by adhesive or snap attachment (not shown). This ball 52 rests in an arcuate cavity 58 in a supporting NYLATRON ring as shown to provide slidability and rotatably for the needle rollers 26.

Referring now to FIG. 14 there is illustrated still another alternate arrangement in which a slidable annular ring is constructed of two halves 54A and 54B having interposed therebetween a compressible resilient material 56. The two ring halves 54A and 54B are also preferably, but not necessarily, of a resilient, compressible material such as NYLATRON; the intermediate material provides greater compressibility and resilience in supporting the rollers. With the upper half 54A of the split ring having circumferentially spaced arcuate cavities 58 to support the needle rollers, all the requisite slidability and roller rotatability is provided in that upon clutch engagement the material 56 becomes resiliently compressed to reduce the rate of change of thrust transmitting forces—or "soften" the clutch engagement forces. Upon arrival at steady state conditions, the material 56 returns to original condition due to its resilience.

FIG. 15 illustrates the ring 48 supported on annular ring 14A of inner race 14 and having a plurality of circumferentially spaced arcuate cavities which are shaped to support rollers 26 in nestled relation.

FIG. 16 illustrates an alternate support ring 48 in which the roller support surfaces of the support ring are provided with arcuate cavities 58 while being sloped sufficient to assist in supporting needle rollers 26 toward inner race 14.

FIG. 17 illustrates an arrangement similar to the arrangement of FIG. 14 wherein the resilient compressible material is replaced by circumferentially spaced coil springs 60. Further, lower ring half 54B and upper ring half 54A include opposed annular cavities to support such coil springs 60. Any resilient member or members may be included along with suitable means to retain such members in position.

Figure 18:
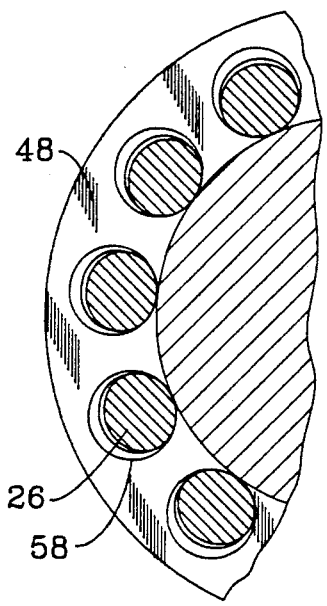
FIG. 18 is a top view of a partial section of a roller support ring having arcuate cavities to support the rollers.
Figure 19:
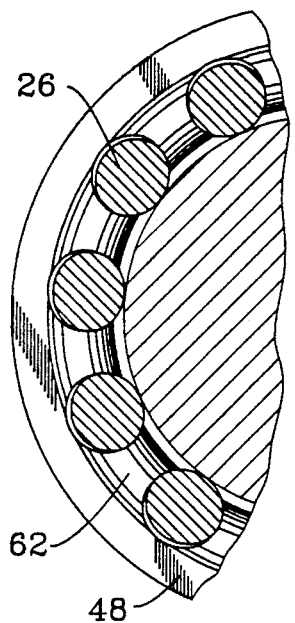
FIG. 19 is a top view of a partial section of an alternate embodiment of a roller support ring of the type shown in FIG. 18 incorporating an annular groove to support the rollers.
Figure 20:
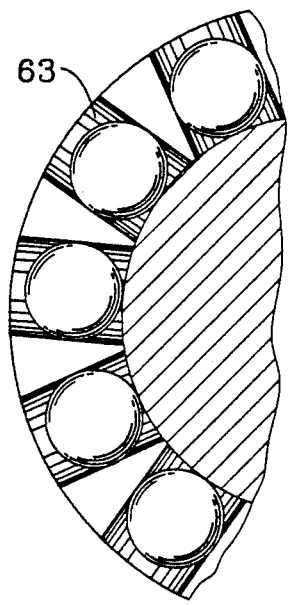
FIG. 20 is a top view of a second alternate embodiment of a roller support ring of the type shown in FIG. 18 incorporating radial extending grooves to support the rollers.

Referring now to FIGS. 18-20, alternative NYLATRON annular support rings are shown in which alternative means to maintain the roller to roller relationship and spacing are provided. In FIG. 18, the ring 48 includes a plurality of circumferentially spaced circular cavities of arcuate cross-section as described previously having a configuration corresponding to that of the roller ends to support the rollers.

In FIG. 19 a circumferential cavity 62 is provided, while in the embodiment of FIG. 20, a plurality of radial cavities 63 are provided. It will be readily appreciated that the roller to roller spacing will be maintained to within more precise limits in the embodiments of FIGS. 18 and 20.

Figure 21:
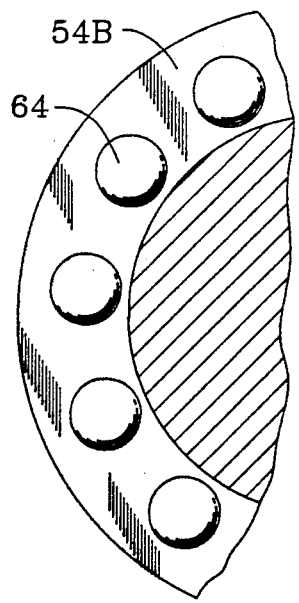
FIG. 21 is a top plan view of a roller support ring of the split ring type with bearing balls positioned therebetween, the view shown with the top ring removed.
Figure 22:
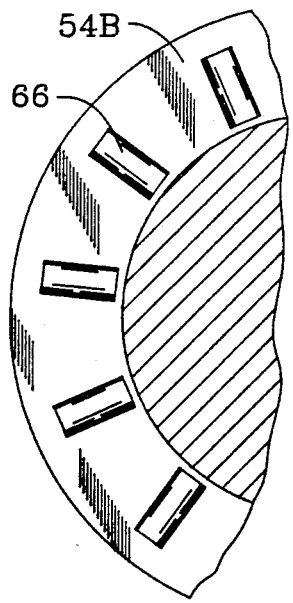
FIG. 22 is a top plan view of an alternate embodiment of the split ring roller support ring of FIG. 21, utilizing elongated roller bearings between the ring halves.
Figure 23:
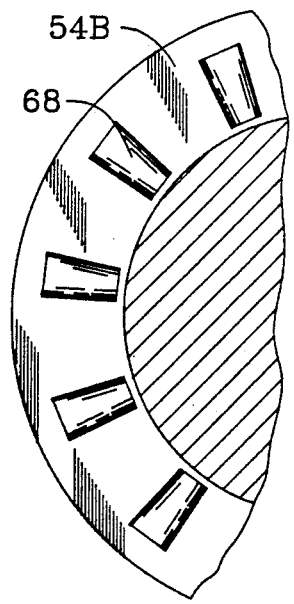
FIG. 23 is a top plan view of still another alternate embodiment of the split ring roller support ring of FIG. 21, utilizing tapered roller bearings between the ring halves.

FIGS. 21-23 illustrate split ring arrangement having rotatable support members between the rings. In these FIGS. the top ring half is removed and the lower ring 54B is shown with supporting bearing balls 64 in FIG. 21, roller bearing needles 66 in FIG. 22 and tapered roller bearings 68 in FIG. 23.

Figure 24:
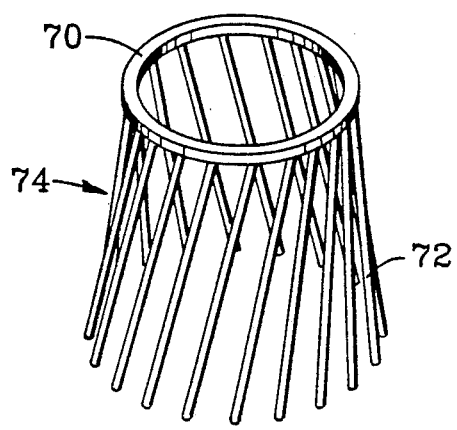
FIG. 24 is a perspective view of a roller cage intended to maintain a predetermined circumferential spacing between the rollers.
Figure 25:
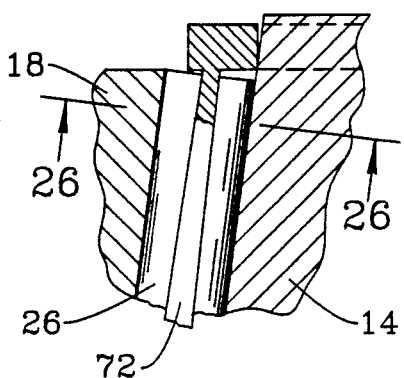
FIG. 25 is a view partially in cross-section, of the roller cage of FIG. 24 positioned between the inner and outer races of the clutch and supporting a roller.
Figure 27:
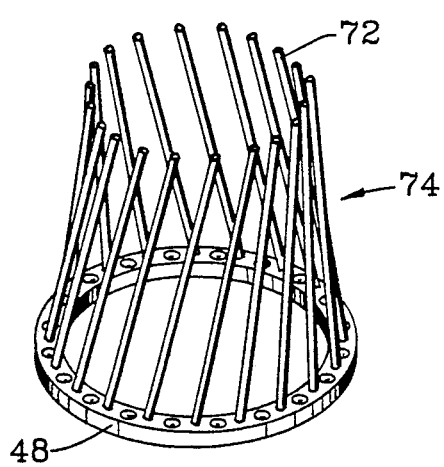
FIG. 27 is a view of another embodiment of a roller cage of the type shown in FIG. 24, but including a part of, or an entire, clutch roller support ring.
Figure 26:
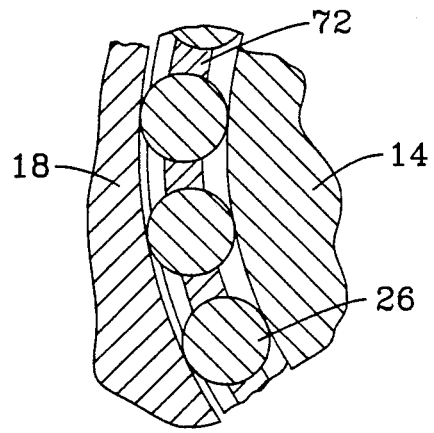
FIG. 26 is a view partially in cross-section, taken along lines 26—26 of FIG. 25.
Figure 28:
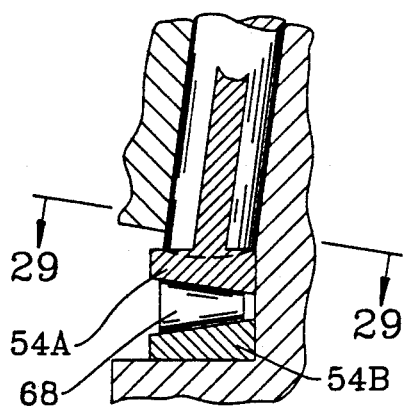
FIG. 28 is a cross-sectional view of a portion of the roller cage of FIG. 27 positioned between clutch races and forming a part of a roller support ring utilized to support the clutch rollers.
Figure 29:
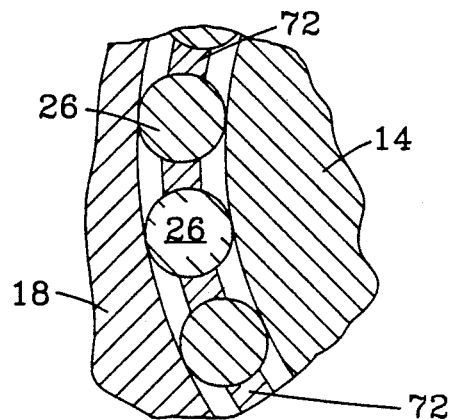
FIG. 29 is a view partially in cross-section, taken along lines 29—29 and illustrating the roller-to-roller separation maintained by the roller cage.

Referring now to FIGS. 24-29 there is illustrated alternate embodiments which include roller cages 74 in combination with either a suitable upper ring 70 as shown in FIG. 24 or with a slidable NYLATRON annular ring 48 as shown in FIG. 27. In each structure, the cage 74 consists of a plurality of elongated roller-to-roller support members suitably configured to support the rollers as they rotate as shown in the cross-sectional views of FIGS. 25-29. In this case, the cage support members 72 may be suitably pivotably connected to the appropriate ring to permit the needle rollers 26 to assume their appropriate orientation with respect to planes containing the central axis; however, in most instances, a small amount of clearance between rollers and cage support members is sufficient to permit proper roller support.

Figure 30:
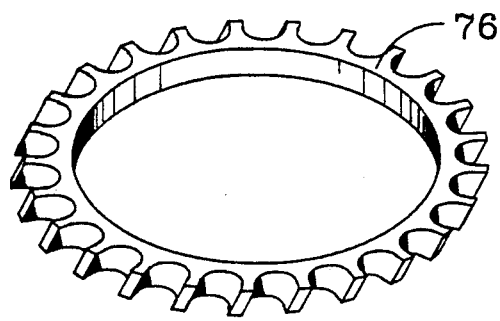
FIG. 30 is a perspective view of an alternate embodiment of a clutch roller support cage.
Figure 31:
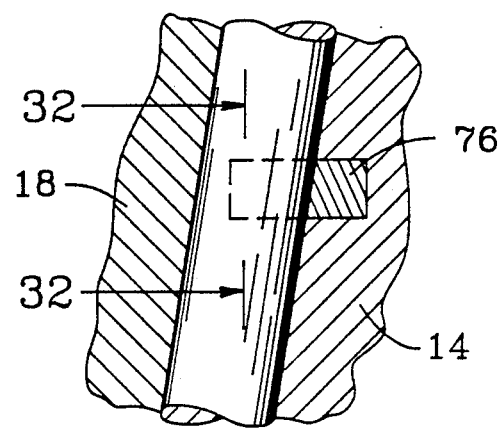
FIG. 31 is a view partially in cross-section of the roller cage of FIG. 30 positioned between the inner clutch race and the rollers thereby maintaining roller-to-roller spacing.
Figure 32:
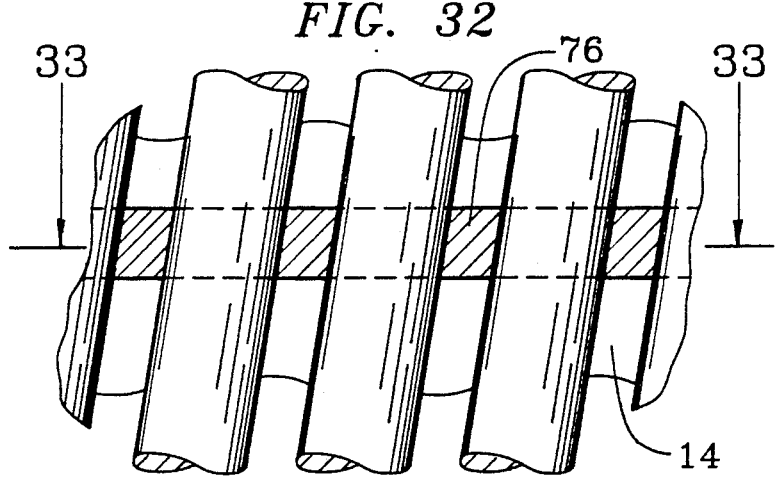
FIG. 32 is a view taken along lines 32—32 of FIG. 31 illustrating the roller-to-roller spacing maintained by the cage of FIG. 30.
Figure 33:
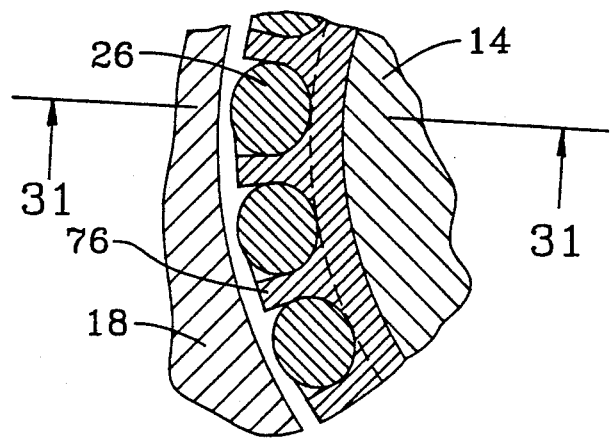
FIG. 33 is a cross-sectional view taken along lines 33—33 of FIG. 32 of the rollers and roller cage of FIG.

FIG. 30 illustrates an alternate roller support cage 76 in the form of an annular ring 76 provided with arcuate or scalloped sections which support a surface portion of each needle roller 26 while permitting appropriate assumption of the appropriate inclination angle of the needle rollers 26.

Referring to FIGS. 34-36 there is illustrated alternative embodiments of the construction of the inner race 14 of the clutch of the present invention. In FIG. 34 the inner race 14 is constructed of a plurality of annular rings 78 (shown in part) placed in face-to-face engaged relation, and having progressively varying dimensions which combine to form an approximate hyperboloidal curve. Thus, the inner race 14 can be conveniently assembled by selecting the progressively dimensional rings 78. Any suitable means (not shown) to retain the rings in face-to-face positions as shown may be provided.

In FIG. 35 the rings are assembled to form a near hyperboloidal surface; in this arrangement resilient members such as annular leaf springs 80 (shown in part) are interposed between the rings 78 to provide a soft clutch engagement by effectively reducing the rate of change of transmitted forces between the inner and outer races.

In FIG. 36 a clutch inner race 14 is shown having a modified hyperboloidal surface 82. This surface 82 is modified approximate by the provision of a wavy (or modified sinusoidal) pattern which provides predetermined override conditions dependent upon the number of contact points between the rollers and the peaks of the sinusoidal surface portions of the modified approximate hyperboloidal surface of the inner race. Thus, by precisely controlling the race surface of the inner race and by precisely controlling the number of sinusoidal "peaks" of the surface, the precise clutch "break away" force—i.e. the force which is sufficient to cause the rollers to slip out of contact with the race surfaces—can be calculated and controlled.

Further, although not shown, the outer race of the clutch can be formed by the techniques shown in FIGS. 34-36. With respect to the embodiment of FIG. 36, it is possible to include a modified sinusoidal approximate hyperboloidal surface on the outer race (not shown) as well as on the inner race as shown in FIG. 36. Such "wavy" sinusoidal approximate hyperboloidal surfaces can be combined to create a precise "override" condition whereby the needle rollers 26 slip at a specific torque transmission.

In the foregoing description, it should be understood that it is most important to provide support for the movement relative to the races at the larger diameter end of the races. Thus, it is contemplated that the annular support ring 48 may be press-fitted to one of the races, provided that one roller support surface thereof is either self-lubricating or well lubricated. Moreover, it has been found that NYLATRON—being a combination of nylon and molybdenum diSulphide—is an excellent material for the annular ring 48. In some instances rings manufactured of nylon have proven to have sufficient resilience, compressibility and lubricity. Thus, such rings may be fabricated of nylon alone. Also, such other materials contemplated are bearing bronze, polyethylene, polypropylene, or even a form of NYLATRON which includes nylon and teflon (for lubricity).

It will be readily appreciated from the foregoing that the particular structure of the present inventive clutch makes it possible to transmit torque by way of the principle utilizing approximate hyperboloidal surfaces and needle rollers without undue jamming of the rollers or gouging of the races. In particular, by the provision of an appropriate and unique interface means between the rollers and the respective supporting race, the major impediment to practical utilization of this principle has been overcome with the result that torque transmission can be accomplished with high efficiency and low profile, while making it possible to selectively control such major parameters as torque overload slip conditions, torque rate of transmission, clutch profile and size, clutch life expectancy, clutch engagements and many more.

What is claimed is:

1. A positive axial clutch including a first member having a surface of revolution about the axis of rotation of the clutch, which surface is derived from a hyperboloid, a second member defining with the first member an annular space between confronting surfaces of the members, one of which is said surface of revolution, and a plurality of thrust transmitting rollers disposed in said annular space so as to engage with the surfaces to make thrust transmitting contact between confronting surfaces for driven rotation of said first or second member in at least one direction, said rollers each having a longitudinal rolling central axis, said hyperboloid from which said surfaces are derived being generated by using said central axis of said rollers as the straight line generators thereof, each roller contacting said surface of revolution of said first member along a generator of said surface or a line which approximates to such a generator, the rollers all being similarly inclined with respect to radial planes, means at an interface between at least one end portion of each of said rollers and at least one of said first and second members to permit slidable movement therebetween at least in a first direction while supporting the rollers axially thereof;

wherein the surfaces approximate generally conical hyperboloidal surfaces having a diameter at one end portion of each member greater than the diameter at the other end portion of the same member;

wherein said means at the interface between said rollers and at least one of said first and second members in an annular support member positioned on and supported by at least one of said members beneath said rollers at the portion of contact of said rollers with said surfaces corresponding to the larger diameter end of each member;

wherein said annular support member is capable of slidable rotation relative to at least one of said members so as to freely support said rollers rotatably relative to at least one of said members.

2. The clutch according to claim 1 wherein said annular member is a self lubricating ring member having one surface in engagement with the end portions of said rollers so as to support said rollers rotatably relative to at least one of said member.

3. The clutch according to claim 2 wherein the supported end portions of said rollers are supported in nestling relationship within correspondingly shaped cavities on said roller supporting surface so as to receive the end portions of said rollers and thereby maintain said rollers in predetermined spaced relation corresponding to the dimension between said cavities.

4. The clutch according to claim 3 wherein said surfaces are capable of thrust transmitting contact so as to transmit torque between said members in dependence upon the number and diameter of said rollers, the length of said rollers, the angle of inclination between said rollers and the generators of said surfaces.

5. The clutch according to claim 4 wherein said torque transmitted between said members is dependent upon the radius of said inner surface at the smaller end and the radius thereof at the larger end.

6. The clutch according to claim 5 wherein the torque transmitted between said members is dependent upon the radius of said outer surface at the smaller end and the radius thereof at the larger end and the smallest outside diameter of the first surface.

7. The clutch according to claim 1 wherein said annular support member defines a plurality of radially extending cavities configured to support the end portions of said rollers and to thereby maintain a predetermined circumferential roller-to-roller spacing corresponding to the spacing of said cavities.

8. A positive axial clutch including a first member having a surface of revolution about the axis of rotation of the clutch, which surface is derived from a hyperboloid, a second member defining with the first member an annular space between confronting surfaces of the members, one of which is said surface of revolution, and a plurality of thrust transmitting rollers disposed in said annular space so as to engage with the surfaces to make thrust transmitting contact between confronting surfaces for driven rotation of said first or second member in at least one direction, said rollers each having a longitudinal rolling central axis, said hyperboloid from which said surfaces are derived being generated by using said central axis of said rollers as the straight line generators thereof, each roller contacting said surface of revolution of said first member along a generator of said surface or a line which approximates to such a generator, the rollers all being similarly inclined with respect to radial planes, means at an interface between at least one end portion of each of said rollers and at least one of said first and second members to permit slidable movement therebetween at least in a first direction while supporting the rollers axially thereof;

wherein said surfaces approximate generally conical hyperboloidal surfaces having a diameter at one end portion of each member greater than the diameter at the other end portion of the same member;

wherein said means at the interface between said rollers and at least one of said first and second members comprises a pair of annular support members having resilient support means positioned therebetween such that upon engagement of said first and second members, said resilient means becomes resiliently compressed to thereby reduce the rate of change of engagement forces between said first and second members upon clutch engagement.

9. The clutch according to claim 8 wherein said resilient support means is a plurality of circumferentially spaced resilient springs.

10. The clutch according to claim 8 wherein said resilient support means is an annular shaped member fabricated of compressible resilient material.

11. A positive axial clutch including a first member having a surface of revolution about the axis of rotation of the clutch, which surface is derived from a hyperboloid, a second member defining with the first member an annular space between confronting surfaces of the members, one of which is said surface of revolution, and a plurality of thrust transmitting rollers disposed in said annular space so as to engage with the surfaces to make thrust transmitting contact between confronting surfaces for driven rotation of said first or second member in at least one direction, said rollers each having a longitudinal rolling central axis, said hyperboloid from which said surfaces are derived being generated by using said central axis of said rollers as the straight line generators thereof, each roller contacting said surface of revolution of said first member along a generator of said surface or a line which approximates to such a generator, the rollers all being similarly inclined with respect to radial planes, means at an interface between at least one end portion of each of said rollers and at least one of said first and second members to permit slidable movement therebetween at least in a first direction while supporting the rollers axially thereof;

wherein said surfaces approximate generally conical hyperboloidal surfaces having a diameter at one end portion of each member greater than the diameter at the other end portion of the same member;

wherein at least the portion of at least one of said first and second members is comprised of a plurality of members positioned in spaced face-to-face relation and having compressible resilient means positioned between adjacent annular members, said annular members being progressively dimensioned such that they define said surfaces and said resilient means reduces the rate of change of forces transferred between said first and second members and said rollers upon transfer of torque between said first and second members.

12. A positive axial clutch including a first member having a surface of revolution about the axis of rotation of the clutch, which surface is derived from a hyperboloid, a second member defining with the first member an annular space between confronting surfaces of the members, one of which is said surface of revolution, and a plurality of thrust transmitting rollers disposed in said annular space so as to engage with the surfaces to make thrust transmitting contact between confronting surfaces for driven rotation of said first or second member in at least one direction, each roller the contacting said surface of revolution of said first member along a generator of said surface, the rollers all being similarly inclined with respect to radial planes, an annular member positioned for slidable rotation adjacent the end portions of said rollers to support the rollers against components of forces transmitted between said confronting surfaces and extending generally along the length of said rollers.

13. A positive axial clutch including a first member having a surface of revolution about the axis of rotation of the clutch, which surface is derived from a hyperboloid, a second member axially spaced from said first member and defining with the first member an annular space between confronting surfaces of the members, one of which is said surface of revolution, and a plurality of thrust transmitting rollers disposed in said annular space so as to engage with the surfaces to make thrust transmitting contact between confronting surfaces for driven rotation of said first or second member in at least one direction, each roller then contacting said surface of revolution of said first member along a generator of said surface, the rollers all being similarly inclined with respect to radial planes containing the axis of revolution, at least one member being axially movable with respect to said other member, means to move at least one member so as to increase the space therebetween such that no rotation is transmitted between said members, an annular member positioned for slidable rotation adjacent the end portions of said rollers to support the rollers against components of forces transmitted between said confronting surfaces and extending generally along the length of said rollers.

14. A positive axial clutch including an inner race having a surface of revolution about a central axis, the surface being substantially a hyperboloid through every point on which at least two straight line generators may be drawn so as to lie wholly in the surface, an outer race defining with said inner race an annular space between confronting surfaces of the races, the outer race having an inner surface of revolution which is substantially a hyperboloid, and a plurality of thrust transmitting rollers disposed in said annular space so as to engage with the hyperboloidal surface to make thrust transmitting contact between confronting surfaces for driven rotation of said inner and outer races in at least one direction, each roller contacting said surface of revolution of said inner race substantially along a generator thereof or a line which approximates to such a generator, said rollers all being similarly inclined with respect to planes containing said central axis, means at the interface between said rollers and at least one of said races to provide slidable movement therebetween at least in a first direction while supporting the rollers axially thereof.

* * * * *